US00RE35547E

United States Patent [19]

Sakuma et al.

[11] E Patent Number: Re. 35,547

[45] Reissued Date of Patent: Jul. 1, 1997

[54] ANTILOCK BRAKE CONTROL APPARATUS

[75] Inventors: Masaru Sakuma; Toshio Takayama, both of Nakakoma-gun, Japan

[73] Assignee: Tokico Ltd., Japan

[21] Appl. No.: 269,041

[22] Filed: Jun. 29, 1994

Related U.S. Patent Documents

Reissue of:

[64] Patent No.: 5,125,723
Issued: Jun. 30, 1992
Appl. No.: 610,519
Filed: Nov. 8, 1990

[30] Foreign Application Priority Data

Nov. 10, 1989 [JP] Japan ..... 1-293342

[51] Int. Cl.[6] ..... B60T 8/64

[52] U.S. Cl. ..... 303/156; 363/158

[58] Field of Search ..... 303/100, 97, 110, 303/103, 104, 105, 106, 107, 108, 109, 113.1, 156, 157, 158; 364/462.02

[56] References Cited

U.S. PATENT DOCUMENTS

| | | | |
|---|---|---|---|
| 3,833,270 | 9/1974 | Gotz et al. | 303/106 |
| 3,870,376 | 3/1975 | Riordan | 303/106 |
| 4,077,675 | 3/1978 | Leiber et al. | 303/110 |
| 4,430,714 | 2/1984 | Matsuda et al. | 303/100 |
| 4,665,490 | 5/1987 | Makaki et al. | 303/110 X |
| 4,881,784 | 11/1989 | Leppek | 303/110 |
| 4,900,100 | 2/1990 | Higashimata et al. | 303/100 |
| 4,941,713 | 7/1990 | Farr | 303/110 |
| 4,962,824 | 10/1990 | Hagiya et al. | 303/97 |
| 5,028,095 | 7/1991 | Okubo | 303/109 X |

*Primary Examiner*—Matthew C. Graham
*Attorney, Agent, or Firm*—Scully, Scott, Murphy & Presser

[57] ABSTRACT

In the present invention, the conditions necessary for the change from the reducing-pressure mode to the holding pressure mode are changed based on the length of the period of instability from the beginning of wheel slippage to the stopping of this slippage, and the length of the period of continued severe locking in which the slip ratio of the wheel exceeds a certain fixed value. Therefore, even when there is a disturbance in the form of roughnesses in the road surface or the like, this is determined to be a temporary phenomenon and the switching of the setting from the reducing-pressure mode to the holding pressure mode can take place in a reliable manner, and the usual, stable braking power can be achieved in correspondence with the relationship between the road surface and the tires.

5 Claims, 5 Drawing Sheets

ANTILOCK BRAKE CONTROL APPARATUS

Matter enclosed in heavy brackets [ ] appears in the original patent but forms no part of this reissue specification; matter printed in italics indicates the additions made by reissue.

*This is a re-issue of application 07/610,519, filed Nov. 8, 1990, now U.S. Pat. No. 5,125,723.*

BACKGROUND OF THE INVENTION

1. Field of the Invention

The present invention relates to an antilock brake control system for automobiles, and more particularly to a technique which makes possible the control of normally adaptable brake pressure in correspondence to the coefficient of friction between the tires and the road.

2. Prior Art

The antilock brake control apparatus shown in Japanese Patent Application, first publication, laid open number 60-35647, is conventionally known as an antilock brake control apparatus which prevents the locking of the wheels of an automobile when braking.

This antilock brake control apparatus has a determining mechanism, which compares previously set standard wheel speeds and standard wheel accelerations with wheel speeds which are detected by means of a wheel speed sensor or wheel accelerations which are differential values thereof, and determines a μ-level (corresponding to the coefficient of friction) between the road surface and the tires, and a changing mechanism, which resets the pressure reduction and stopping level of brake fluid pressure when antilock brake controlling is based on the μ-level determined by the determining means.

By means of this, in the case in which the "H" level (the coefficient of friction is large) has been determined by the determining mechanism, the pressure reduction and stopping level is set at a low "H-μ", and the reduction in brake pressure is stopped comparatively early. Furthermore, in the case in which the "L" level (the coefficient of friction is small) has been determined by the determining mechanism, the pressure reduction and stopping level is set at a high "L-μ", and the reduction in brake pressure is stopped comparatively late.

In an antilock brake control apparatus with the above construction, the μ-level is determined based on the wheel speed, the wheel acceleration, the standard wheel speed and the standard wheel acceleration, or is based on a slip ratio calculated from the wheel speed and a simulated body speed (for example, a body speed inferred from fixed deceleration (tendencies)). In addition, it makes the appropriate setting of the pressure reduction and stopping level of the brake pressure to "H-μ" or "L-μ". However, this type of determining and setting method has a problem, as shown by a line in FIG. 6, in that when momentary large slippage occurs as a result of unevennesses in the road surface (for example, the wheels bounce while the brakes are being applied), although the value should be H-μ, the recovery (reduction) of the slip ratio takes some time, so that "L-μ" is erroneously determined.

Furthermore, when brake pressure is being decreased, as shown by the line in FIG. 7, when the recovery of the wheel speed is small (the acceleration is small), for example, in the case in which a friction-reducing material such as sand or water is temporarily present on the road surface, or in the case in which the fluid pressure is being controlled in a manner appropriate for a "H-μ" road surface, or the like, although the actual value is H-μ, "L-μ" is erroneously determined.

SUMMARY OF THE INVENTION

The present invention was created in view of the above circumstances; when antilock brake control is being carried out, the standards of determination of the change from a state of reducing pressure to a state of holding pressure are set based on 1) the length of the period of instability from the beginning of wheel slippage to the stopping of this slippage, and 2) the length of the period of continued severe locking in which the slip ratio of the wheel exceeds a certain fixed value. By means of this, even when there is a disturbance in the form of roughnesses in the road surface or the like, this is determined to be a temporary phenomenon and the switching of the setting from the reducing-pressure mode to the holding pressure mode can take place. It is an object of the present invention to provide an antilock brake control apparatus with the above-mentioned characteristics.

In addition, in order to achieve the above purpose, the invention incorporates a vehicle wheel speed sensor;

a modulator to set one mode for the vehicle wheel brake fluid, the mode selected from the group of an increase pressure mode, a decrease pressure mode, and a holding pressure mode, a controller for controlling said modulator, which makes a decision to determine if slippage is occurring based on vehicle wheel speed data from said vehicle wheel speed sensor, said controller selecting decreasing pressure mode on the detection of the initiation of vehicle wheel lock, holding pressure mode on the detection of the termination of vehicle wheel lock, and increase pressure mode on the detection of vehicle wheel rotation above a preset level, said controller provided with a first determining mechanism, said mechanism determining if the period of instability from the initiation of slippage to the termination of that slippage exceeds a previously set first threshold value;

a second determining mechanism, said mechanism determining if the length of the period in which severe locking is occurring exceeds a previously fixed second threshold value: and a condition-changing mechanism, to change the conditions necessary for the transfer from the reducing-pressure mode to the holding pressure mode based on the results of the first and second determining mechanisms.

According to the invention constructed in this fashion, the conditions necessary for the change from the reducing-pressure mode to the holding pressure mode are changed based on the length of the period of instability from the beginning of wheel slippage to the stopping of this slippage, and the length of the period of continued severe locking in which the slip ratio of the wheel exceeds a certain fixed value. Therefore, even when there is a disturbance in the form of roughnesses in the road surface or the like, this is determined to be a temporary phenomenon and the switching of the setting from the reducing-pressure mode to the holding pressure mode can take place in a reliable manner, and the usual, stable braking power can be achieved in correspondence with the relationship between the road surface and the tires.

DETAILED DESCRIPTION OF THE PREFERRED EMBODIMENTS

Hereinafter, the construction of an antilock brake control apparatus which is a preferred embodiment of the present invention will be explained with reference to FIGS. 1–5.

Figure 1:
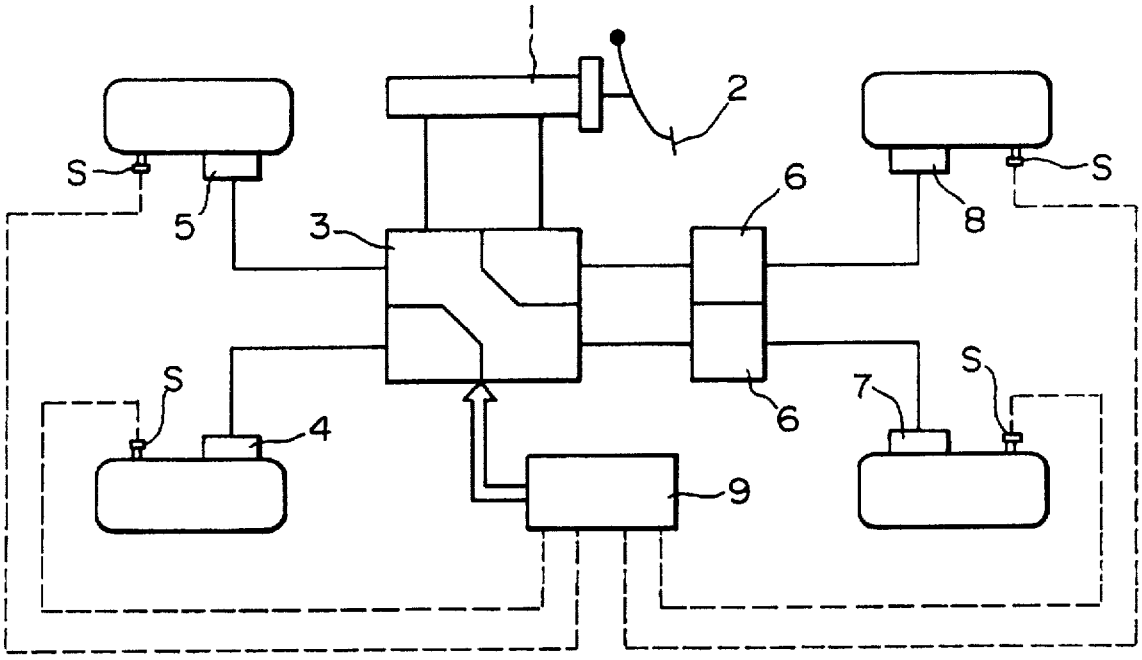
FIG. 1 is a piping diagram showing the brake fluid system to supply hydraulic fluid to the wheel cylinder of the brake.

First, the general construction of the antilock brake control apparatus will be explained by means of FIGS. 1 and 2.

Numeral 1 indicates the master cylinder; this master cylinder 1 releases brake fluid by means of the stepping force on brake pedal 2. The brake fluid released by this master cylinder 1 is supplied through the medium of modulators 3 to the wheel cylinders 4 and 5 of brakes (not shown in the figure) of the left and fight front wheels, and is supplied through the medium of fluid pressure control valve 6 to the wheel cylinders (not shown in the figure) of brakes 7 and 8 of the left and right rear wheels. Modulators 3 are provided on the piping systems from master cylinder 1 to each wheel cylinder 4, 5, 7, and 8, to regulate rises in brake fluid pressure by means of a control signal supplied by controller 9, and to serve the function of restoring fluid pressure. A detailed description of these modulators 3 is given below.

Furthermore, wheel speed sensors S, which detect peripheral speed, are provided at each wheel; by means of a control signal supplied by controller 9 to modulator 3 based on the wheel speed data obtained by these wheel speed sensors S, some types of antiskid control are effected.

Figure 2:
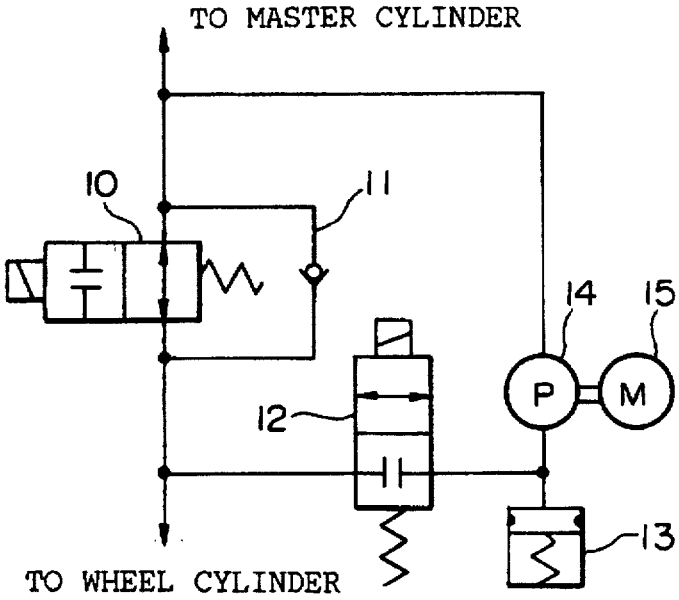
FIG. 2 is a piping diagram showing a provided modulator.

Next, the concrete construction of each modulator 3 is explained by means of FIG. 2.

Numeral 10 indicates a switching valve, which switches position from open to closed; by means of this switching valve 10, the piping system leading from master cylinder 1 to each wheel cylinder 4, 5, 7, and 8 can be opened and closed. Furthermore, a check valve 11 is provided at the switching valve 10; when switching valve 10 is in the "closed" position, the flow of fluid in the direction of master cylinder 1 is allowed.

In addition, switching valve 12 is connected in a parallel position with switching valve 10; this switching valve 12 performs, by means of a control signal supplied by controller 9, an opening and closing operation to release fluid pressure within wheel cylinders 4, 5, 7, and 8 to reserve 13. Numeral 14 indicates a pump which is driven by motor 15; this pump 14 is driven, by means of a control signal from controller 9, to restore the fluid pressure of the piping system which was lowered at the time of antiskid control.

By means of the above construction, a modulator 3 is set to one of the following:

a) the increasing-pressure mode, in which switching valve 10 is set to "open" and switching valve 12 is set to "closed", b) the decreasing-pressure mode, in which switching valve 10 is set to "closed" and switching valve 12 is set to "open", or c) the holding pressure mode, in which both switching valves 10 and 12 are set to "closed";

thus the flow of fluid in the piping between each wheel cylinder 4, 5, 7, and 8, and master cylinder 1, is controlled.

Furthermore, in the antilock brake control executed by controller 9, wheel speed Rω and wheel acceleration Rω', which is the differential value thereof (however, when decelerating, this value becomes negative) are calculated based on the signals supplied by each wheel speed sensor S, the slip ratio S is calculated from, for example, simulated wheel speed V, which infers a body speed from a fixed deceleration value, and wheel speed Rω, and the modulators 3 are set to the increasing-pressure mode, the decreasing-pressure mode, or the holding pressure mode, based on the results of this calculation.

In other words, basically, in the case in which slip ratio S exceeds a previously fixed value, or in the case in which wheel acceleration Rω' (wheel speed Rω) decreases beyond a previously fixed value, brake fluid pressure is decreased, and furthermore, in the case in which slip ratio S decreases beyond a previously fixed value and wheel acceleration Rω' (wheel speed Rω) acquires a tendency to increase, brake fluid pressure is increased.

Figure 3:
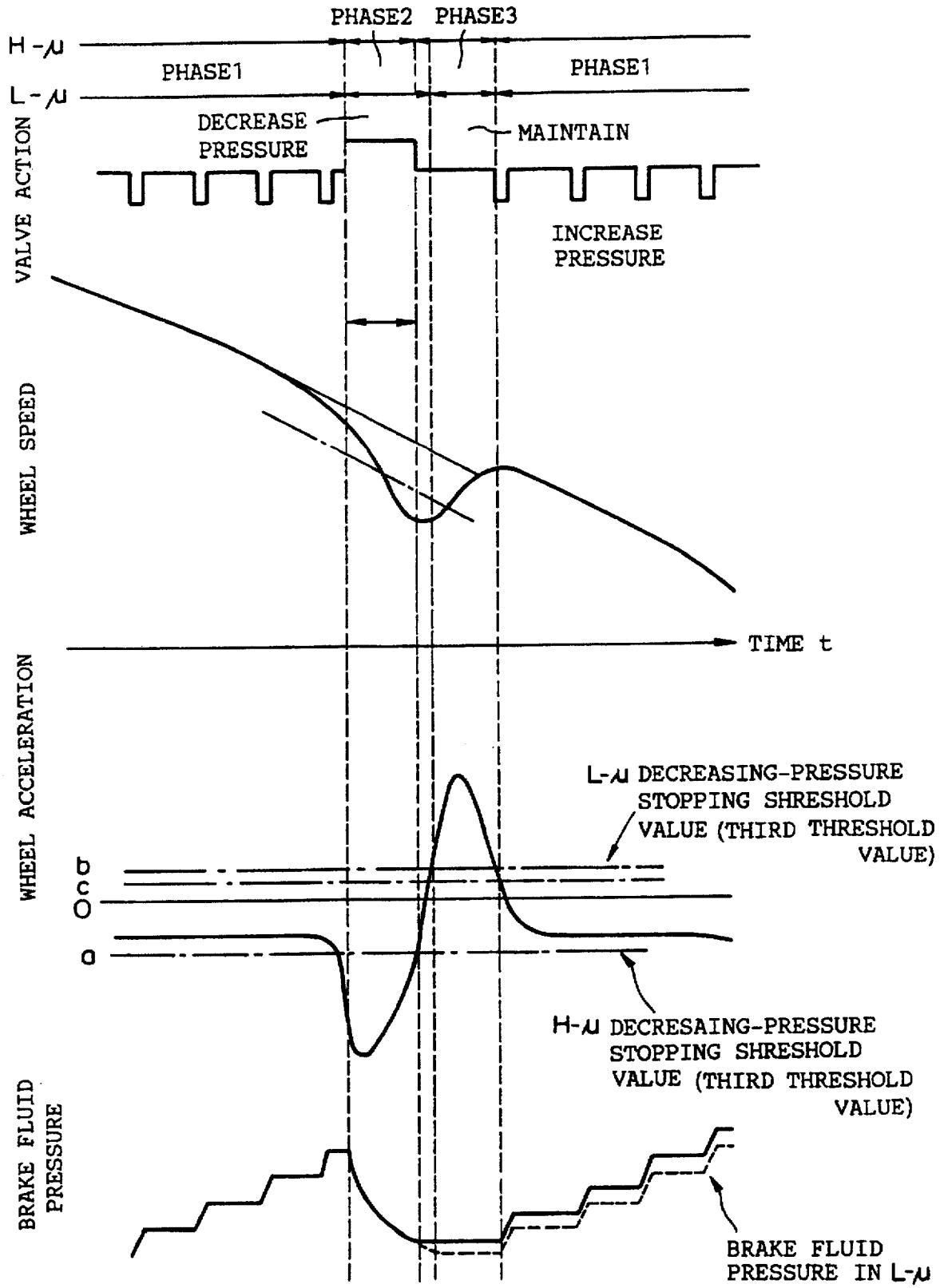
FIG. 3 is a graph which indicates the time variation of the wheel speed, wheel acceleration, and brake fluid pressure, based on the operation of a valve.
Figure 4:
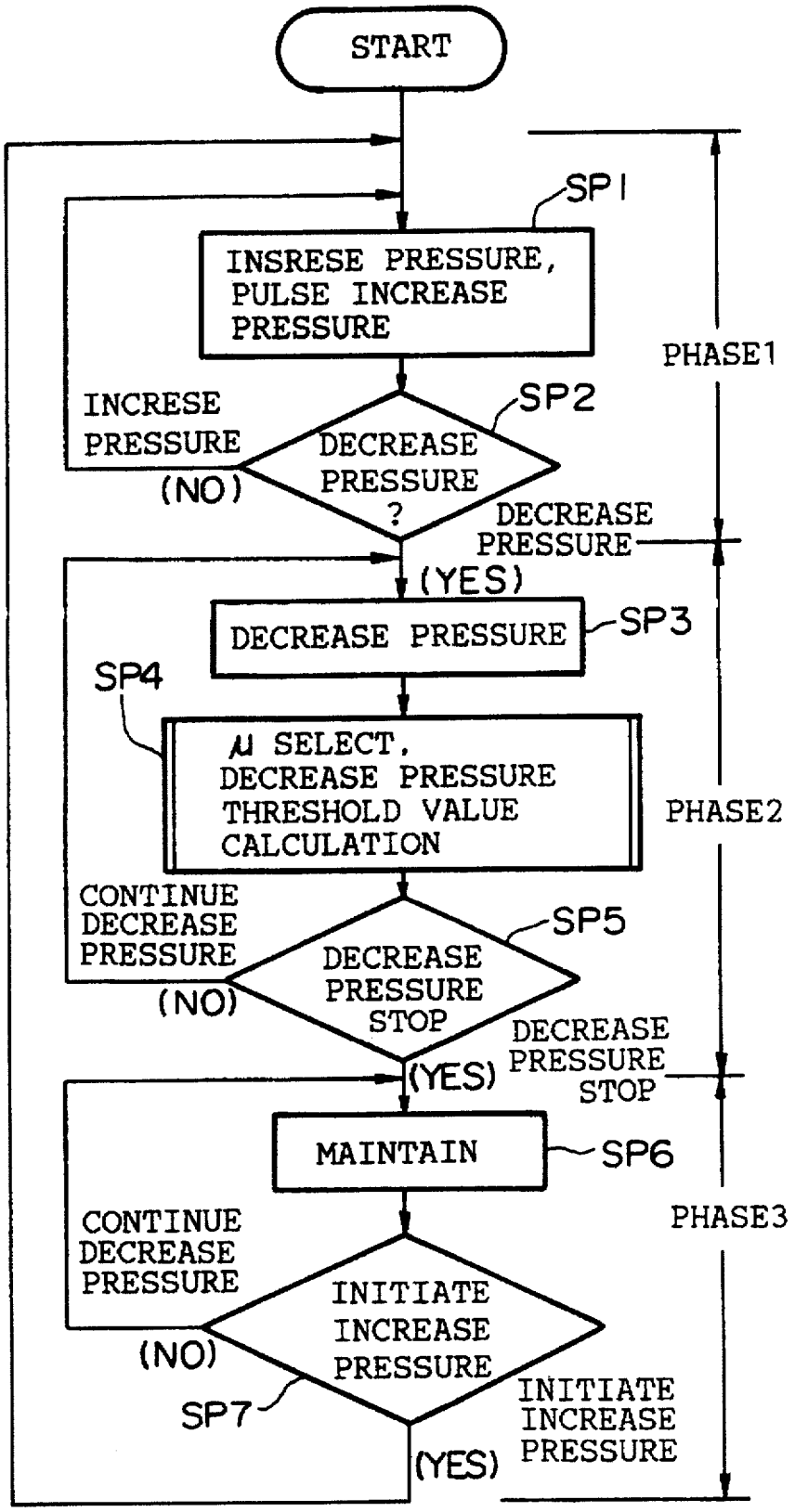
FIG. 4 is a flow chart showing regulation of the brake fluid pressure when the wheel acceleration Rω' is decreased or increased beyond a fixed value.

Here, the brake fluid pressure controlling operation in the case in which the wiled acceleration Rω' is decreased or increases beyond a fixed value will be explained with reference to FIG. 3 and the flow chart of FIG. 4.

Wheel speed Rω and wheel acceleration Rω', which are used as input data in the following explanation, are calculated on the basis of wheel speed data outputted by wheel speed sensor S, as stated above. Furthermore, the contents of the control shown in the flowchart below are stored in the above-mentioned controller 9.

Phase 1

SP1: This begins when brake pedal 2 is pressed: it sets the increasing-pressure mode and increases the brake fluid pressure according to the increase in the fluid pressure of master cylinder 1, or by steps.

SP2: A determination is made as to whether a wheel has slipped with respect to the road surface and wheel acceleration Rω' (wheel deceleration) has reached a previously fixed reducing-pressure stopping threshold value "a", in other words, whether wheel acceleration Rω' has gone below ×|a|; if the result of this determination is "NO", control is returned to SP1, and if the result is "YES", control proceeds to the following SP3.

Phase 2

SP3: The increasing-pressure mode set by modulator 3 is reset to the decreasing-pressure mode, and the brake fluid pressure is decreased. By means of this, the slipping condition of the wheel with respect to the road surface is rectified and the revolutions of the wheel begin to recover.

SP4: One or the other of the "H-μ" reducing-pressure stopping threshold value (third threshold value) (=a) and the "L-μ" reducing-pressure stopping threshold value (third threshold value) (=b) is selected.

Figure 5:
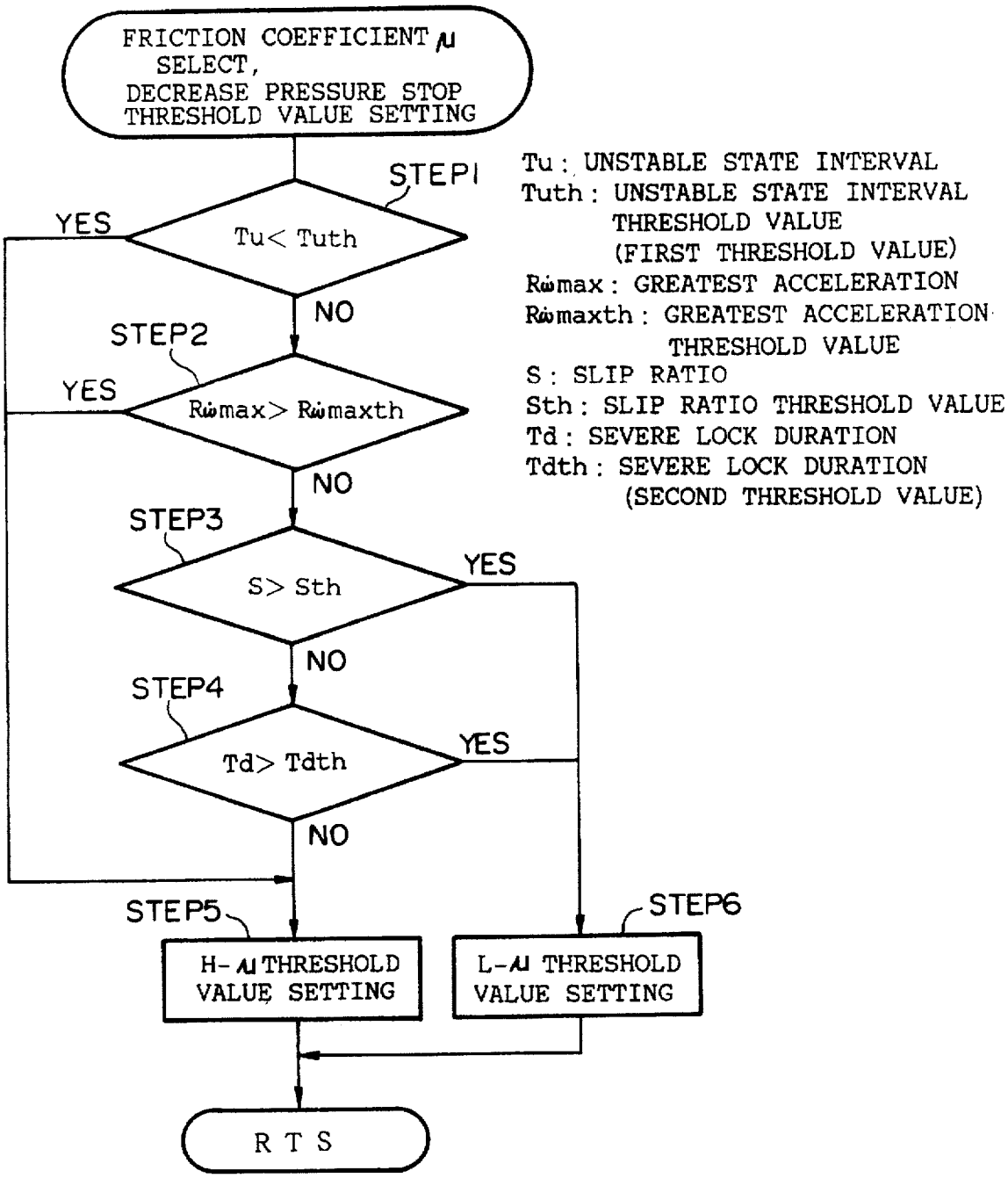
FIG. 5 shows a flow chart of the selected decision basis to decide the decrease pressure stop.

The former "H-μ" reducing-pressure stopping threshold value (=a) is selected when the μ-level (corresponding to the coefficient of friction) between the tie and the road surface is determined to be at the "H" level; on the other hand, the "L-μ" reducing-pressure stopping threshold value (=b) is selected when the μ-level is determined to be at the "L" level (the coefficient of friction is small)(the procedure for selecting one or the other of these reducing-pressure stopping threshold values will be explained hereinbelow with reference to FIG. 5).

These reducing-pressure stopping threshold values (a, b) correspond to the third threshold value shown in the claims.

SP5: A determination is made as to whether the wheel rotation has recovered and wheel acceleration Rω' (wheel deceleration) has reached a previously fixed reducing-pressure stopping threshold value, in other words, whether wheel acceleration Rω' has exceeded −|a| or |b|; if the result of this determination is "NO", control is returned to SP3, and if the result is "YES", control proceeds to the following SP6.

Phase 3

SP6: When the wheel rotation recovers and wheel acceleration Rω' exceeds a previously set reducing-pressure stopping threshold −|a| or |b|, the reducing-pressure mode set by modulator 3 is reset to the holding pressure mode, and brake fluid pressure is maintained.

SP7: When the holding pressure mode is set by modulator 3, wheel acceleration Rω' gradually stabilizes: however, a determination is made as to whether at this time, wheel acceleration Rω' goes below a previously set threshold value |c|.

By means of this determination, in the case in which Rω' is greater than threshold value |c| and the result is "NO", control returns to SP6 and the holding pressure mode continues, in the case in which Rω' is less than threshold value c and the result is "YES", control returns to SP1 of Phase 1, the holding pressure mode which was set by modulator 3 is reset to the increasing-pressure mode, and the brake fluid pressure is increased by steps.

Next, the flowchart which selects one or the other of the "H-μ" reducing-pressure stopping threshold value (=a) and the "L-μ" reducing-pressure stopping threshold value (=b), which form the basis for the determination of the transfer from the reducing-pressure mode to the holding pressure mode and which are shown in SP4 cf Phase 2, will be explained with reference to FIG. 5.

In the explanation below, the basis for the determination of the "period of the unstable state", from the beginning of wheel slippage to the stopping of this slippage, for the selection of the reducing-pressure stopping threshold value is calculated based on the data which are outputted by wheel speed sensors S, as described above.

1) The period of the unstable state is the period of Phase 2 and Phase 3; the basis for the determination of the selected reducing-pressure stopping threshold value is whether or not this period exceeds a fixed value (Tuth).

2) The maximum acceleration is shown in the time of the recovery of wheel speed in Phases 2 and 3; the basis for the determination of the selected reducing-pressure stopping threshold value is whether or not this maximum acceleration exceeds a fixed value (Rω' maxth).

Figure 6:
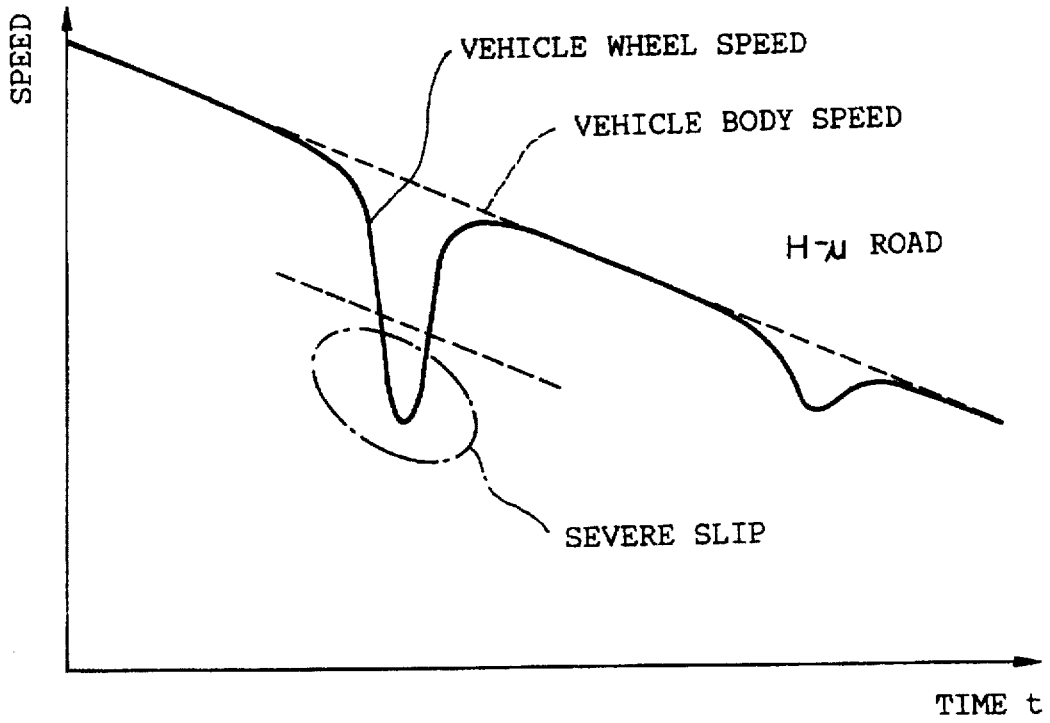
FIG. 6 is a graph showing the relationship of vehicle body speed and wheel speed when a strong slip of the wheel occurs on the road surface.
Figure 7:
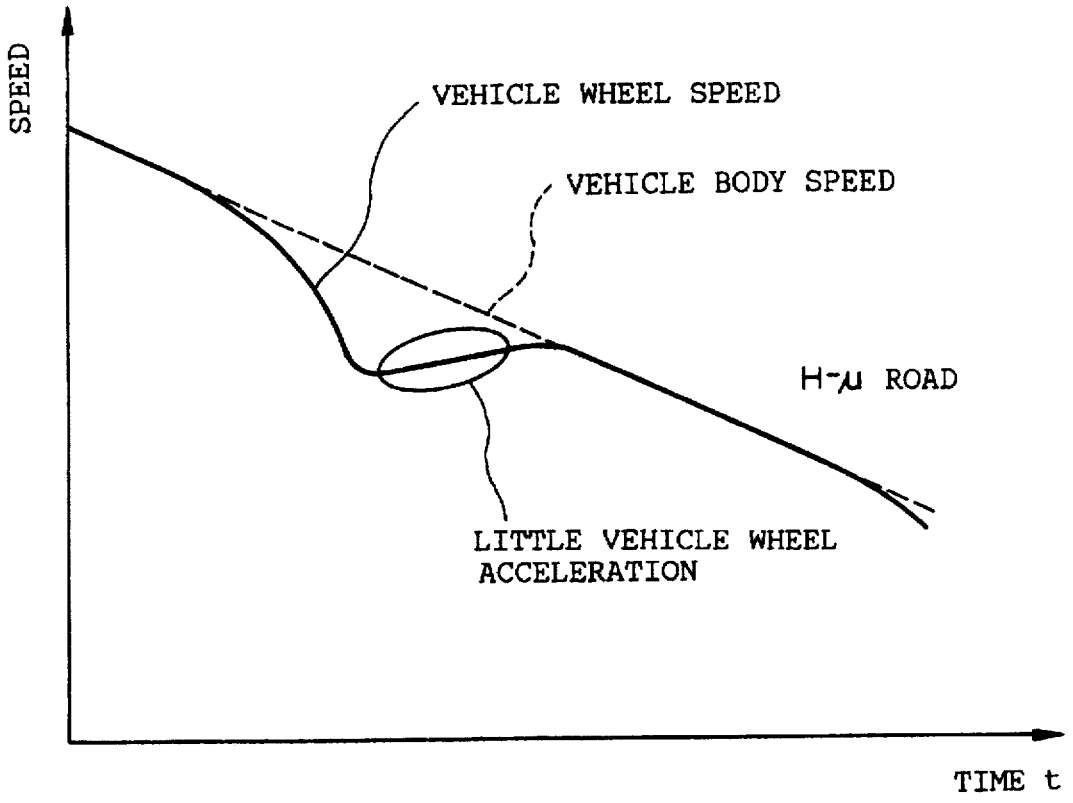
FIG. 7 is a graph showing the relationship of vehicle body speed and wheel speed in the case in which simultaneous slip is produced.

3) The presence or absence of extremely severe locking is determined, as shown by the prior art in FIG. 6, by the degree of separation of body speed and wheel speed, or in other words, by the size of the slip ratio; the basis for the determination of the selected reducing-pressure stopping threshold value is whether or not this slip ratio exceeds a fixed value (Sth).

4) The period of the continuation of severe locking is shown by the period in which the slip ratio exceeds a fixed value (Sth'; however, Sth'<Sth); the basis for the determination of the selected reducing-pressure stopping threshold value is whether or not this period exceeds a fixed value (Tdth).

These bases of determination (1)–(4) will be explained hereinbelow by the flowchart of FIG. 5.

Next, using the bases of determination (1)–(4) and with reference to FIG. 5, the flowchart for the purpose of selecting the reducing-pressure stopping threshold value will be explained.

1. (first determination mechanism)

A determination is made as to whether the period of the unstable state (Tu) is less than the basic unstable state period threshold value (first threshold value) (Tuth), in other words whether the period of the unstable state (Tu) is shorter; if the result of this determination is "YES", control proceeds to step 5, if the result is "NO", control proceeds to the following step 2.

Step 2. (acceleration determination mechanism)

A determination is made as to whether the maximum wheel acceleration (Rω'max) is greater than the maximum acceleration threshold value (Rω'maxth), which forms the basis, if the result of this determination is "YES", control proceeds to step 5, if the result if "NO", control proceeds to the following step 3.

Step 3. (slip ratio determination mechanism)

A determination is made as to whether the slip ratio S is greater than the slip ratio threshold value (Sth), which forms the basis; if the result of this determination is "YES", control proceeds to step 6, if the result is "NO", control proceeds to the following step 4. By means of making a determination as to whether the slip ratio S is greater than the slip ratio threshold value (Sth), it can be determined whether a wheel has experienced extremely severe locking.

Step 4. (second determination mechanism)

A determination is made as to whether the locking period (Td) exceeds the severe locking continuing period threshold value (Tdth), which forms the basis; if the result of this determination is "YES", control proceeds to step 6, if the result is "NO", control proceeds to the following step 5.

Step 5. (condition-changing mechanism)

The μ-level (corresponding to the coefficient of friction) between the road surface and the tire is determined to be "H-level", and by this determination, the "H-μ" reducing-pressure stopping function threshold value (=a) is set as the basis for the determination for transferring from the reducing-pressure mode to the holding pressure mode.

Step 6. (condition-changing mechanism)

The μ-level (corresponding to the coefficient of friction) between the road surface and the tire is determined to be "L-level", and by this determination, the "L-μ" reducing-pressure stopping function threshold value (=b) is set as the basis for the determination for transferring from the reducing-pressure mode to the holding pressure mode. (The change in brake fluid pressure in the case in which the "L-μ" reducing-pressure stopping function threshold value (=b) is set is shown by the lowest dotted line in FIG. 3.)

In the flowchart in FIG. 5, it is permissible to use, as the calculated values used for the determination of step 1, step 2, step 3, and step 4, the numerical values of the brake fluid cycle at those times, or brake fluid cycle values being used when antilock controlling was previously carried out. However, it is preferable that the timing of the flowchart shown in FIGS. 4 and 5 be short and the determination thus conform to the actual road surface conditions at the time of the determination; therefore, it is preferable to use the numerical values of the brake fluid cycle at the time of the determination.

As explained above, according to the antilock apparatus shown in the present embodiment, it is possible to accurately determine the μ-level between the road surface and a tire and set either the "H-μ" reducing pressure stopping threshold value (=a) or the "L-μ" reducing pressure stopping threshold value (=b), by using the following standards:

1) the period of the unstable state, 2) the greatest acceleration, 3) the presence of absence of extremely severe locking, and 4) the period of the continuance of severe locking.

It is thus possible to obtain normal, stable braking force according to the relationship between the road surface and the tires.

By means of this, even in cases in which there are temporary unevennesses in the road surface causing disturbances, the disturbances are determined to be temporary, and the setting of a mistaken reducing pressure stopping threshold value is avoided.

In the present preferred embodiment, one of either the "H-μ" reducing pressure stopping threshold value or the "L-μ" reducing pressure stopping threshold value is selected by means of the determination standards shown in (1)–(4), but the present invention is not limited to this; it is permissible to set the reducing pressure stopping threshold value in an analog manner based on the determination standards (1)–(4) (finding the reducing pressure stopping threshold value by calculation, or storing a number of reducing pressure stopping threshold values in advance and selecting one).

Furthermore, in the flowchart of the present invention, the reducing pressure stopping threshold value is selected according to the four determination standards shown in (1)–(4), but it is of course possible to add other determination standards if the speed of the determination processing is not late.

What is claimed is:

1. An antilock brake control apparatus comprising a) a vehicle wheel speed sensor;

b) a modulator to set one mode for the vehicle wheel brake fluid, the mode selected from the group consisting of an increasing pressure mode, a decreasing pressure mode and a holding pressure mode, c) a controller for controlling said modulator, which makes a decision to determine of slippage is occurring based on vehicle wheel speed data from said vehicle wheel speed sensor, said controller selecting decreasing pressure mode on the detection of the initiation of vehicle slip, holding pressure mode on the detection of the recovery tendency of wheel slip, and increasing pressure mode on the detection of the termination of wheel slip, by comparing said vehicle wheel speed data with a standard threshold value for mode selection, said standard threshold value including a transition threshold value for determining the transition from said [holding] *decreasing* pressure mode to said [increasing] *holding* pressure mode, said transition threshold value being selected from at least two threshold values, High-μ for high frictional level condition and Low-μ for low frictional level condition, said High-μ being set as a lower barrier [in case of a] *to* transition from said [holding] *decreasing* pressure mode to said [increasing] *holding* pressure mode than the Low-μ;

*said controller having:* means for a first determination, said means comparing the period of instability from the initiation of slippage to the termination of that slippage, with a previously set first threshold value;

a means for a second determination, said means comparing the length of the period in which severe wheel slip is occurring with a previously fixed second threshold value; and a means for a third determination, said means comparing a maximum rotational acceleration of the vehicle wheel speed data with a previously fixed acceleration threshold value; and a condition changing means for changing the conditions for the transition from the decreasing pressure mode [and] *to* the holding pressure mode, *by selecting one out of said at least two threshold values,* based on the results of the means for the first, second and third determinations, wherein said condition changing means selects the High-μ when the first determination means determines that the period of instability from the initiation of slippage to the termination of that slippage is smaller than a previously set first threshold value; or the third determination means determines that the maximum rotational acceleration of the vehicle wheel calculated from the vehicle wheel speed data exceeds the previously fixed acceleration threshold value, and said condition changing means selects the Low-μ when the second determination means determines that the length of the period in which severe wheel slip is occurring exceeds a previously fixed second threshold value.

2. An antilock brake control apparatus according to claim 1, wherein said standard threshold value is vehicle wheel acceleration.

3. An antilock brake control apparatus according to claim 1, wherein said Low-μ is greater than or equal to zero, and said High-μ is less than or equal to zero.

4. An antilock brake control apparatus according to claim 1, wherein said condition changing means selects the Low-μ in the case where a slip ratio exceeds a previously set slip ratio.

5. An antilock brake control apparatus according to claim 1, wherein said first and third [determination is done] *determinations are performed* based on [the] data of the previous braking operation.

* * * * *